(12) United States Patent
Weisel (10) Patent No.: US 10,517,228 B2
(45) Date of Patent: Dec. 31, 2019

(54) SEEDING AND/OR PLANTING SYSTEM

(71) Applicants: B+M TEXTIL GMBH & CO. KG, Sehmatal-Cranzahl (DE); Niklas Andreas Wilm Weisel, Annaberg-Buchholz (DE)

(72) Inventor: Niklas Andreas Wilm Weisel, Annaberg-Buchholz (DE)

(73) Assignees: B+M Textil GmbH & Co. KG, Sehmatal-Cranzahl (DE); Wilm Weisel, Niklas Andreas, Annaberg-Buchholz (DE)

( * ) Notice: Subject to any disclaimer, the term of this patent is extended or adjusted under 35 U.S.C. 154(b) by 129 days.

(21) Appl. No.: 15/543,725

(22) PCT Filed: Nov. 20, 2015

(86) PCT No.: PCT/IB2015/059010
§ 371 (c)(1),
(2) Date: Jul. 14, 2017

(87) PCT Pub. No.: WO2016/113609
PCT Pub. Date: Jul. 21, 2016

(65) Prior Publication Data
US 2017/0347534 A1 Dec. 7, 2017

(30) Foreign Application Priority Data
Jan. 14, 2015 (DE) .................... 20 2015 100 160 U (51) Int. Cl.
*A01G 9/02* (2018.01)
*A01G 24/00* (2018.01)
(Continued)

(52) U.S. Cl.
CPC ............. *A01G 9/024* (2013.01); *A01G 9/025* (2013.01); *A01G 24/00* (2018.02); *A01G 31/00* (2013.01);
(Continued)

(58) Field of Classification Search
CPC ........ A01G 9/024; A01G 9/025; A01G 9/022; A01G 31/00; A01G 31/02
See application file for complete search history.

(56) References Cited

U.S. PATENT DOCUMENTS

| | | |
|---|---|---|
| 2013/0219788 A1 | 8/2013 | Vanlente |
| 2016/0249522 A1 | 9/2016 | Weisel |

FOREIGN PATENT DOCUMENTS

| | | |
|---|---|---|
| DE | 3804356 A1 | 6/1988 |
| DE | 8911056 U1 | 9/1989 |

(Continued)

*Primary Examiner* — Kristen C Hayes
(74) *Attorney, Agent, or Firm* — Laurence A. Greenberg; Werner H. Stemer; Ralph E. Locher (57) ABSTRACT

A seed and/or plant system contains a strand-shaped seed and/or plant carrier suspended on a mounting. The seed and/or plant carrier contains several seed and/or plant locations with seeds and/or plants arranged spaced apart from each other in its longitudinal extension. The seeds and/or the plants are supplied with a liquid via a supply tube. In order for the seed and/or plant locations in the seed and/or plant system to be provided at a distance from one another definable by the manufacturer of the seed and/or plant system in a simple manner, a sleeve is provided on each of the seed and/or plant locations, from which a substrate with the seed and/or the plant is received or receivable and/or which at least partially forms a substrate for the seed and/or the plant, wherein the sleeve is formed from the or around the seed and/or plant carrier.

16 Claims, 6 Drawing Sheets

(51) Int. Cl.
  *A01G 31/00*   (2018.01)
  *A01G 31/02*   (2006.01)
  *A01G 24/48*   (2018.01)
  *A01G 24/18*   (2018.01)

(52) U.S. Cl.
  CPC .............. *A01G 31/02* (2013.01); *A01G 24/18* (2018.02); *A01G 24/48* (2018.02); *Y02P 60/244* (2015.11)

(56)    References Cited

FOREIGN PATENT DOCUMENTS

| | | | | |
|---|---|---|---|---|
| DE | 202009014675 U1 | 10/2009 | | |
| DE | 202012104884 U1 | 5/2010 | | |
| DE | 102010045666 B4 | 4/2013 | | |
| DE | 202013104576 U1 | 2/2015 | | |
| DE | 202015100027 U1 * | 4/2016 | ............. | A01G 9/025 |
| JP | 5495198 B1 * | 5/2014 | ............. | A01G 9/024 |
| WO | 8602523 A1 | 5/1986 | | |

* cited by examiner

SEEDING AND/OR PLANTING SYSTEM

BACKGROUND OF THE INVENTION

Field of the Invention

The present invention relates to a seed and/or plant system, which comprises at least one strand-shaped seed and/or plant carrier, which is secured to a mounting in a suspended manner, wherein the seed and/or plant carrier comprises several seed and/or plant locations with seeds and/or at least one plant, which are arranged at a distance from one another in the longitudinal extension of the support, wherein the seed and/or the at least one plant is/are supplied with a liquid via at least one supply tube or at least one supply channel.

Greening systems for greening facades or roofs not only serve the embellishment of objects, but also improve the air by reducing pollutants and producing oxygen. Furthermore, they can also be used for noise protection. In order to prevent crippled or stunted growth when greening, it is, however, vitally important to maintain a distance between individual seeds and/or seedlings depending on a plant species. By a distance between the individual seeds respectively the seedlings ideally adjusted to the plant species, the plant is not impeded in its growth and a later deformation of the plants can be prevented.

The document DE 89 11 056 U1 discloses a seed pad consisting of at least two fleece layers made of natural fibers, wherein a reinforcing track is arranged between the fleece layer on which seeds are sprinkled. Disadvantageously, however, the sprinkling of the seeds on the reinforcement track results in an uneven seed distribution. The fleece layers and the enclosed reinforcement track have an uneven seed distribution. The fleece layers and the enclosed reinforcement track are needled with each other so that the seeds are fixed in their insertion position. Due to the stability of the seed pad, it is for example suitable for greening slopes. Furthermore, there is a possibility to locally fix the seed pad in order to prevent its slippage.

The document DE 20 2009 014 675 U1 discloses a planting plate for facade greening, wherein the planting pad is fixed to the facade on the manner of a slate shingle. The planting plate comprises a plastic plate onto which a substrate carrier provided with seeds is applied, wherein the substrate carrier primarily serves the purpose of holding the roots of plants and water.

A vertical greening system is disclosed in the document DE 20 2012 104 884 U1. The vertical greening system comprises a carrier plate, which is fixed to load-bearing walls. For covering the carrier plate, a covering fleece is provided, which can be folded in such a way that it forms pocket-like shapes. A water-storing substrate is brought into these plant pockets, which, along with the fleece, forms a rootable medium for plants. For watering the plants, a channel serving as a water guiding profile is provided below the carrier plate of the vertical greening system. In another embodiment, the vertical greening system can also comprise a frame formed of the water guiding profile.

The document DE 10 2010 045 666 B4 comprises a greening system for greening vertical and inclined surfaces. The greening system has a vegetation support layer as well as a watering structure, which are arranged in such a way that a transport of water and/or nutrients is happening between the vegetation support layer and the watering structure. Furthermore, a covering and retention layer comprising several growth openings can be additionally arranged in front of the vegetation layer, covering it.

BRIEF SUMMARY OF THE INVENTION

It is object of the present invention to provide a seed and/or plant system of the above-mentioned type, in which the seed and/or plant locations can be provided in an easy and cost-effective way at a distance, for example definable by the manufacturer of the seed and/or plant system.

The object is solved by a seed and/or plant system of the above-mentioned type in which a sleeve is respectively provided on the seed and/or plant locations from which a substrate with the seeds and/or the plant is received or receivable and/or which forms at least partially a substrate for the seed and/or the plant, wherein the sleeve is formed from the or around the seed and/or plant carrier.

By way of the at least one sleeve, on which a seed and/or plant location is respectively provided, the position of the respective seed and/or plant location as well as the distance between the individual seed and/or plant locations of the seed and/or plant system according to the invention, are clearly definable. With the present invention, the sleeve can thereby be manufactured directly from the material of the seed and/or plant carrier. Hereby, the sleeve can for example be formed by a deepening in the seed and/or plant carrier. Thereby it has proven to be especially advantageous, if the seed and/or plant carrier is formed in band-shaped manner. In other, also advantageous embodiments of the present invention, the seed and/or plant carrier can, however, also be formed in shape of a cord, a rope, a rope ladder or a hose.

However, the sleeve can also be formed around the seed and/or plant carrier in ring or clamp-like manner as a separate device component, in which case it can be formed from the same material as the seed and/or plant carrier or also from at least one other material.

With the present invention, the substrate for the seeds and/or the plant, which or who are supposed to be provided on the respective seed and/or plant location, can be provided within the sleeve, that is the sleeve can encase the substrate at least partially. This variant of the present invention allows it to insert the seeds and/or the plants in the sleeve only then, if the seed and/or plant carrier with the sleeve is already suspended. In this embodiment, a withered or dead plant can furthermore be easily removed from the sleeve or the sleeve, respectively the substrate surrounded by the sleeve, can be fitted with new seeds and/or a new plant.

With the invention, it is, however, also possible that the material of the sleeve itself at least partially forms the substrate for the seeds and/or the plant. Thus, the sleeve, which receives the substrate and/or itself forms the substrate for the seeds and/or the plants, forms an ideal basis for the growth of the plants forming from the seeds, respectively for the plant already received by the sleeve. The sleeve formed in such a way from the seed and/or plant carrier can receive a substrate, which either already comprises the seeds and/or plants, when inserting them in the sleeve or in which the seeds or plants are yielded only after inserting the substrate in the sleeve. The substrate offers an ideal breeding ground for the seeds and plants and furthermore supports the root development of the at least one plant.

Preferably, the seeds and/or plants are already inserted in the substrate when applying the sleeve around the seed and/or plant carrier, since thereby manufacturing and installation effort can be reduced. However, it is also possible that the seeds and/or plants are only inserted in the substrate, for example pushed in, after fixing the substrate on the seed and/or plant carrier. Furthermore, it also possible that the seeds and/or plants are not inserted in the substrate but are provided externally on the substrate or next to the substrate or within at least one hollow provided in the substrate.

It has proven to be especially advantageous, if the sleeve at least partially forming the substrate is formed cylindrical. In other embodiments, the sleeve can just as well comprise any other form. Furthermore, an original form of the sleeve can change, for example due to the insertion of a plant in the sleeve and/or the plant growth within the sleeve.

With the seed and/or plant system according to the invention, the used strand-shaped seed and/or plant carrier comprises several seed and/or plant locations spaced apart from each other in longitudinal extension of the seed and/or plant carrier, each on which the seeds, respectively the seed and/or at least one plant can be provided. The distance of the seed and/or plant locations from each other can for example be chosen based on the plant species or a length of the seed and/or plant carrier. Accordingly, the dimensions of the seed and/or plant carrier as well as the dimensions and embodiments of the seed and/or plant locations can be chosen freely.

For ideally supplying the seeds and/or the at least one plant, they are supplied with the liquid via at least one supply tube or at least one supply channel according to the invention. With the present invention, liquids mean watery media such as water containing or not containing nutrients, oils and/or gels. The liquid can also contain at least one pesticide or can be a combination of various substances.

In an embodiment of the present invention, the supply tube or the supply channel can be arranged in such a way that it (they) is provided directly above the seed and/or plant carrier so that the liquid can flow or drip onto the seed and/or plant carrier through an opening provided on the supply tube or the supply channel.

In general it is, however, also possible that the at least one seed and/or plant carrier is merely arranged in an environment of the supply tube or the supply channel and is supplied with the liquid through at least one canal element suitable for liquid guidance, such as a channel, a tube or a hose, attached to the supply tube or the supply channel or extending from the supply tube or the supply channel. Thus, it is for example possible that the seed and/or plant carrier can be suspended laterally of an opening of the supply tube or the supply channel or several seed and/or plant carriers suspended laterally of an opening of the supply tube or the supply channel can be supplied with the liquid via the same opening. The seed and/or plant carrier can thereby be arranged in the environment of the supply tube or the supply channel in such a way that the liquid can flow or drip onto the at least one seed and/or plant carrier arranged spaced apart from the supply tube or the supply channel.

With the present invention, the suspended strand-shaped seed and/or plant carrier encased by the seed and/or plant system is secured to a mounting which can be formed from all imaginable forms and can be provided on all imaginable spots. Thus, the mounting can for example be formed as a simple hook, which can for example be fixed on a curtain rod, a ceiling or a roof. Furthermore, the mounting can also comprise at least one rod or at least one longitudinal profile, in which at least one hole is provided through which the strand-shaped seed and/or plant carrier can be led and/or on which the seed and/or plant carrier can be held by means of at least one knot inserted in the seed and/or plant carrier. Moreover, the strand-shaped seed and/or plant carrier can also simply be wound around any object and can be held on the object by means of a knot or another fastening element such as a bracket or an adhesive.

The seed and/or plant system according to the invention can be used on the most diverse locations. Thus, it can for example be attached to house facades, roofs, bridges, noise protection walls or the like. Moreover, the seed and/or plant system according to the invention can, however, also be formed freestanding so that it can for example be used as a room partition or as a visual protection on balconies or in courtyards. Besides, the seed and/or plant system according to the invention can be also used for arrangements in sea aquariums, clarification tanks or the like when equipping with underwater plants.

Preferably, at least one sleeve is aligned transversely or longitudinally to the longitudinal extension of the seed and/or plant carrier. With the alignment of the sleeve is hereby meant the alignment of a longitudinal or inner central axis of the sleeve, such as a rotation axis of a cylindrical axis. Thus, the longitudinal axis of the sleeve is preferably aligned parallel to the longitudinal extension of the seed and/or plant carrier when attaching the sleeve around the seed and/or plant carrier, whereby the sleeve can be easily provided and fixed on the seed and/or plant carrier for example by axially sliding onto the seed and/or plant carrier or by clamping the seed and/or plant carrier in a bracket-like manner. If the sleeve is formed by a deepening in the seed and/or plant system in another embodiment of the invention, it is advantageous when manufacturing if this deepening is made transversely to the longitudinal extension of the seed and/or plant carrier.

Especially preferable, a thermoformed or deep-drawn area of the seed and/or plant carrier forms the sleeve, wherein a base area of the thermoformed or deep-drawn area comprises at least one opening. The thermoforming or deep-drawing is especially suitable for manufacturing the sleeve, since sleeve-like structures can be manufactured easily and cost-effectively from a previously flat basic material with this method. The methods can be used both in mass fabrication as well as in small-batch production. A significant advantage of the deep drawing is furthermore that, despite the forming process, the material thickness of the deep-drawn material stays primarily the same.

The at least one opening can for example be generated by punching out the base area of the thermoformed or deep-drawn sleeve. By this at least one opening, the seed and/or the plant can be ideally supplied with the liquid, even if the sleeve material itself is liquid-repellent. The liquid can simply enter an inside of the sleeve through the at least one opening and can provide the seeds and/or plants provided there with the liquid. Furthermore, the roots of the plants can spread out through the at least one opening and thus be easily supplied with the liquid.

In another appropriate embodiment of the seed and/or plant system according to the invention, the seed and/or plant carrier is formed from extruded plastic and/or at least one metal strip and/or at least one textile strap or from a compound of at least two of the named materials. If the seed and/or plant carrier is formed from extruded plastic, its material can be used especially advantageously in order to, as mentioned above, form at least one sleeve of the seed and/or plant carrier, for example by thermoforming. With a formation of the seed and/or plant carrier from a metal strip, the deep drawing can be used in order to form at least one sleeve of the seed and/or plant carrier from the metal strip. When using the textile strap as seed and/or plant carrier, the at least one sleeve can for example be formed by stretching the textile strap. A formation of the seed and/or plant carrier from textile strap is also especially advantageous, if the sleeve is not only formed from the seed and/or plant carrier, but also around the seed and/or plant carrier.

By easy and cost-effectively realizable procedure steps, sleeves with a largely variable and definable size and form and high durability can thus be formed.

In an alternative embodiment of the seed and/or plant system according to the invention, the sleeve is clamped on the seed and/or plant carrier and/or is fixed on the seed and/or plant carrier with at least one fixing element. For clamping the sleeve on the seed and/or plant carrier, the sleeve preferably comprises an opening or a gap on which the sleeve can be applied to the seed and/or plant carrier. Thereby, the material of the sleeve is preferably flexible in such a way that the opening or the gap can be widened or stretched for the application to the seed and/or plant carrier and tightens in such a way after the application that the sleeve clamps stabile on a chosen position of the seed and/or plant carrier.

For fixing the sleeve on the seed and/or plant carrier it is furthermore possible to provide at least one fixing element on the or around the sleeve. It is especially preferable if the fixing element is at least a bracket or at least a C-ring, since the sleeve can be well fixed with these fixing elements, they are easy to apply and comprise a high stability. In other embodiments, however, the fixing element can for example also be at least one thread, a rope, a strap, a cloth and/or a similar element suitable for fixing.

In an optional embodiment, the fixing element comprises seeds. Since plants develop from the seeds, it can be made sure by this embodiment of the invention that after some time at least one plant grows from the, on the or around the fixing element, which covers the fixing element, whereby gaps in the greening can be prevented.

It has furthermore proven to be especially advantageous if the substrate comprises rock wool and/or a mineral, artificial or natural fiber-like and/or at least one open-pored organic or inorganic foam structure. With the present invention, rock wool, textile fibers and open-pored foam structures particularly serve as seed and/or plant substrate(s), since such materials are able to absorb and store a lot of liquid due to their open porosity and the roots of plants can moreover spread well in the open-pored materials. In other embodiments, however, other materials can also be used as a substrate.

In another favoured embodiment of the seed and/or plant system according to the invention, a supply strand is fixed on the supply tube or the supply channel parallel to the seed and/or plant carrier, wherein the supply strand is in liquid conductive contact with the seed and/or plant carrier. Through the contacting of the supply strand with the seed and/or plant carrier, the liquid applied to or guided into the supply strand out of the supply tube or the supply channel, is discharged to the seed and/or plant carrier. The contacting can thereby take place continuously or in intervals. Similar to the seed and/or plant carrier, the supply strand can thereby be fixed on the mounting in a suspended manner. Furthermore, the supply strand can be designed in such a way with regard to its material and its length and form that it optically adapts to the seed and/or plant carrier so that it, after the greening has taken place, is hardly perceived as a separate component of the seed and/or plant system.

With the embodiment of the invention in which the seed and/or the plant is inserted in a thermoformed or deep-drawn area of the seed and/or plant carrier with at least one opening in the base area of the thermoformed or deep-drawn area, it is especially advantageous, if the supply strand is arranged in such a way that it touches the substrate, the seeds and/or the roots of the plant(s) in the area of the at least one opening. Thus, the roots of the plants and/or the seeds can be supplied with liquid directly via the supply strand and the sleeve material itself still be formed from a liquid-repellent material.

In the embodiment in which the sleeve is arranged around the seed and/or plant carrier with the seeds and/or the plant, the supply strand is preferably arranged in such a way that the supply strand contacts or can contact the sleeve formed as a substrate.

Furthermore, it has proven to be advantageous, if the seed and/or plant system comprises an arm, a swivel arm, at least one guidance, a lever or a rocker for pressing the at least one supply strand against the at least one seed and/or plant carrier or vice versa. Due to the pressure, a contact between the supply strand and the seed and/or plant carrier is established, whereby the latter can be supplied with the liquid guided through the supply strand. The pressing against the supply strand by means of the swivel arm, lever or the like makes it possible to supply liquid to the seed and/or the plant as required.

Preferably, a pressure mark of the arm, the swivel arm, the lever or the rocker on the supply strand is provided on an upper end of the supply strand so that the supply strand can contact the parallelly fixed seed and/or plant carrier as high up as possible. The contacting of the seed and/or plant carrier on the upper end ensures that the seed and/or plant carrier can be supplied with enough liquid across its entire length. Depending on the size and constructive design of the seed and/or plant system, the dimension, arrangement and constructive form of the arm, swivel arm, lever or the rocker can be varied.

The supply strand can also be led through the seed and/or plant carrier at least partially, whereby the liquid can be ideally dispensed from the inside to the outside to the or in the seed and/or plant locations provided in the seed and/or plant carrier. This variant moreover has the advantage that the supply strand can here be advantageously covered by the seed and/or plant carrier respectively the plants growing on or out of the plant locations.

It is provided in various embodiments of the present invention that the supply strand is permanently in contact with the seed and/or plant carrier. With such an embodiment it is useful if at least one valve is provided on a liquid discharge opening of the supply tube or the supply channel, the supply strand or on another location of the components guiding the liquid of the seed and/or plant system, with which the liquid supply to the supply strand and/or from the supply strand to the seed and/or plant carrier can be controlled or regulated.

It has proven to be useful, if the seed and/or plant carrier is stored on or in the mounting by means of a slide bearing. For this, the mounting is preferably formed as a channel or tube, in which or on which the slide bearing holding the at least one seed and/or plant carrier, is provided. The holding and guiding of the seed and/or plant carrier in the slide bearing has the advantage that the at least one seed and/or plant carrier can for example be inserted in the slide bearing by threading and can for example be brought out of it again by simply pulling out. Furthermore, the at least one seed and/or plant carrier can be shifted if needed so that for example the accessibility to the seed and/or plant locations is improved and/or a free view can be established.

When forming the mounting as or on the or in the supply channel, it may be advisable to apply the slide bearing in the supply channel, since thus space can be saved and the supply channel at the same time offers an ideal mounting and fixing for the slide bearing without the need to provide an additional fixing element. Due to the difficult accessibility with the formation of the mounting as a closed element, such as a supply tube, it is advisable to provide the slide bearing on the outside of the supply tube, such as below or on a side of the supply tube.

If several seed and/or plant carriers are stored on or in the mounting by means of the slide bearing, they can be coupled among each other by means of a permanent or detachable connection, whereby the coupled seed and/or plant carriers can be moved synchronously for example in the supply channel or the supply tube or along another track formed by a component of the seed and/or plant system according to the invention and thus form a suspended conveying system.

In another optional embodiment of the seed and/or plant system according to the invention it is provided that the supply tube or the supply channel forms the mounting of the seed and/or plant carrier. Such an embodiment of the seed and/or plant system according to the invention has the advantage that a separate mounting for the at least one seed and/or plant carrier, preferably attached parallel to the supply tube or the supply channel can be done without. Thus, not only the space requirements of the seed and/or plant system according to the invention, but also the costs for this system can be reduced.

When forming the supply tube filled or fillable with liquid or the supply channel filled or fillable with liquid as mounting, an additional supply strand can advantageously also be done without, since the seed and/or plant carrier can herein be directly supplied with the liquid by the supply tube or the supply channel. Depending on the arrangement of the seed and/or plant carrier, an additional liquid supply element can however be used for this purpose on or close to the supply tube or the supply channel. The liquid supply element can for example be formed as a pipe or hose and guide the liquid from the supply tube or the supply channel to the seed and/or plant carrier.

For holding the at least one seed and/or plant carrier, for example hooks, clamping elements, brackets or other support means can be provided on the supply tube or the supply channel.

It is, however, also possible to provide the seed and/or plant carrier and the supply strand directly on the supply tube or the supply channel or to connect it with it.

Especially preferable, the supply strand leads through an opening in a base of the supply tube or the supply channel and is vertically suspended from the base. In this embodiment, the supply strand is directly supplied with the liquid flowing through or in the supply tube or through or in the supply channel directly via the opening in the base of the supply tube or the supply channel.

Thereby the supply strand can also be held in the supply tube or the supply channel by means of a knot inserted in the supply strand or a fixing element provided in the supply tube or the supply channel. The opening in the base of the supply tube or the supply channel can for example be provided as a drill, as an opening with filter, sieve, valve and/or nozzle, as an opening with inserted pipe or hose or a differently formed opening.

In an embodiment of the invention in which the supply tube or the supply channel forms the mounting for the seed and/or plant carrier, it is also possible to lead the seed and/or plant carrier through this opening and fix it on the inside of the supply tube or the supply channel.

According to another advantageous embodiment of the seed and/or plant system according to the invention it is provided that the supply strand is fixed in a channel sink of the supply channel and leads across a channel edge. For this, a fixing element is provided in the supply channel with which the supply strand can be held in the channel sink.

The attachment of the seed and/or plant carrier in the channel sink of the supply channel is advantageous, since the seed and/or plant carrier can also receive liquid at a low liquid level in the channel sink, wherein the seed and/or plant carrier can for example supply itself with a nutrient liquid via capillary suction powers. In other embodiments of the present invention, the seed and/or plant carrier can however also, depending on the liquid level, be placed and fixed outside of the channel sink.

In another embodiment of the present invention, at least two seed and/or plant carriers which are fixed in a channel sink of the supply channel can be provided on the supply channel. With such a formation of the seed and/or plant system according to the invention, the at least two seed and/or plant carriers can for example be arranged opposite each other on both sides of the supply channel. Thus, the at least two seed and/or plant carriers can be preferably fixed on the same fixing element provided in the supply channel. Furthermore, such an arrangement of the seed and/or plant carriers allows the attachment and liquid supply of as many seed and/or plant carriers as possible on the supply channel. Accordingly, an efficient seed and/or plant system can be provided cost-effectively and with a low space requirement.

Another preferred embodiment of the seed and/or plant system provides that the supply strand is fixed on the same supply tube or the same supply channel as the seed and/or plant carrier. This has the advantage that the costs and the space requirement of the seed and/or plant system according to the invention can be reduced, since a parallel arrangement for the at least one seed and/or plant carrier and for the supply strand can be done without.

In an advanced embodiment of the present invention, at least one supply strand protrudes into the supply channel and is fixed approximately in the middle on or in the supply channel, wherein at least two seed and/or plant carriers are fixed on the supply channel and are led to the supply strand in such a way that the seed and/or plant locations of the seed and/or plant carriers are in liquid-guiding contact with the supply strand. Thus, several seed and/or plant carriers can fit on the supply strand from the outside and can be supplied with the liquid by it. Hereby, a very cost-effective and space-saving variant of the seed and/or plant system according to the invention can be provided.

BRIEF DESCRIPTION OF THE SEVERAL VIEWS OF THE DRAWING

Preferred embodiments of the present invention, their structure, function and advantages are explained in more detail by the following figures, wherein FIG. 1 schematically shows a possible embodiment of a seed and/or plant system according to the invention in a frontal view.

DESCRIPTION OF THE INVENTION

Figure 1:
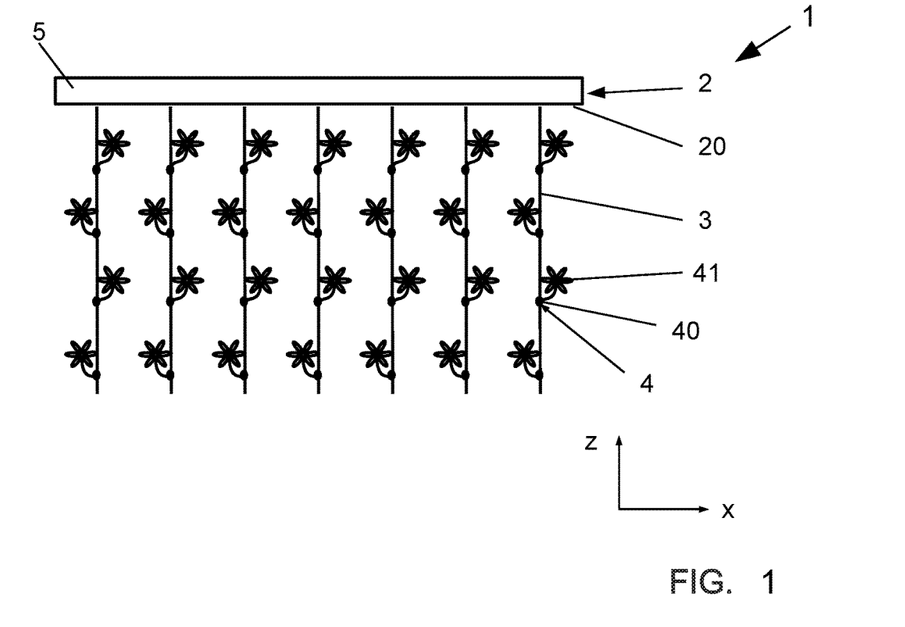

FIG. 1 schematically shows a possible embodiment of a seed and/or plant system 1 according to the invention in a frontal view. The seed and/or plant system 1 comprises a number of seed and/or plant carriers 3 which are vertically suspended on mountings 2 of the seed and/or plant system 1.

The seed and/or plant carriers 3 are formed in strand-like fashion. They can for example be formed as straps, strings, ropes, hoses or cords. The seed and/or plant carriers 3 can for example be formed of extruded plastic, of metal or of textile strap.

In the embodiment shown in FIG. 1, the mounting 2 is formed within a supply channel 20. In other embodiments, a supply tube can also be provided instead of the supply channel 20. However, the mounting 2 can also be provided on other suitable locations of the seed and/or plant system 1 and/or comprise different forms. Thus, the mounting 2 can for example also be formed as a tube, as a rod, as a longitudinal profile, in form of one or several hooks or the like. Depending on the formation of the mounting 2, the supply channel 20 can be provided separately or be formed in one piece with the mounting 2. Moreover, also only one seed and/or plant carrier 3 can be fixed on the supply channel 20 or a supply tube in other embodiments of the invention.

The supply channel 20 or the supply tube serves for receiving and conducting a liquid 5. The liquid 5 can for example comprise tap water, rain water and/or a nutrient solution, but also at least another watery solution, an oil and/or a gel.

The seed and/or plant carriers 3 are supplied with this liquid 5 via the supply channel 20 or the supply tube. Due to the suspended fixation of the seed and/or plant carriers 3 on the supply channel 20 or the supply tube, the liquid 5 can, going out from the supply channel 20, respectively spread in the entire seed and/or plant carrier 3.

Each seed and/or plant carrier 3 shown in FIG. 1 comprises several spaced apart seed and/or plant locations 4. In the depicted embodiment a plant 41 is provided on each of the seed and/or plant locations 4. In other, not depicted embodiments of the present invention, only individual seed and/or plant locations 4 with plants 41 can also be provided. Furthermore, seeds or seed can also be provided on the seed and/or plant locations 4 instead of and/or in addition to the depicted plants 41.

In the embodiment of FIG. 1, the seed and/or plant locations 4 on the seed and/or plant carriers 3 are each provided at equal distance to each other and, with regard to the individual seed and/or plant carriers 3 suspended side by side, symmetrically. In the shown embodiment adjacent seed and/or plant locations 4 of a seed and/or plant carrier 4 in particular are arranged on it evenly offset to one another, protruding to the left or to the right. In other, not shown embodiments of the present invention, the seed and/or plant locations 4 can also be provided asymmetrically and/or unevenly spread on the respective seed and/or plant carriers 3.

The plants 41 are respectively provided in sleeves 40. In the example of FIG. 1, a plant 41 is provided in each of the sleeves 40, respectively. In other embodiments of the present invention, the individual sleeves 40 can also carry several plants 41 or seeds.

The liquid 5 brought into the supply channel 20 can, before being led into the supply channel 20 or the supply tube, for example be stored in a liquid collecting container, basin or suchlike. The liquid 5 can be discharged from the liquid collecting container to the supply channel 20 by means of a liquid supply device. The liquid supply device can comprise tubes, channels or hoses and/or a conveying system with at least one pump, at least one valve, at least one sieve and/or suchlike. Furthermore, the liquid 5 can also be received directly by the supply channel 20, for example by receiving rain water, without previously having to be stored in a liquid collecting container or the like.

Figure 2:
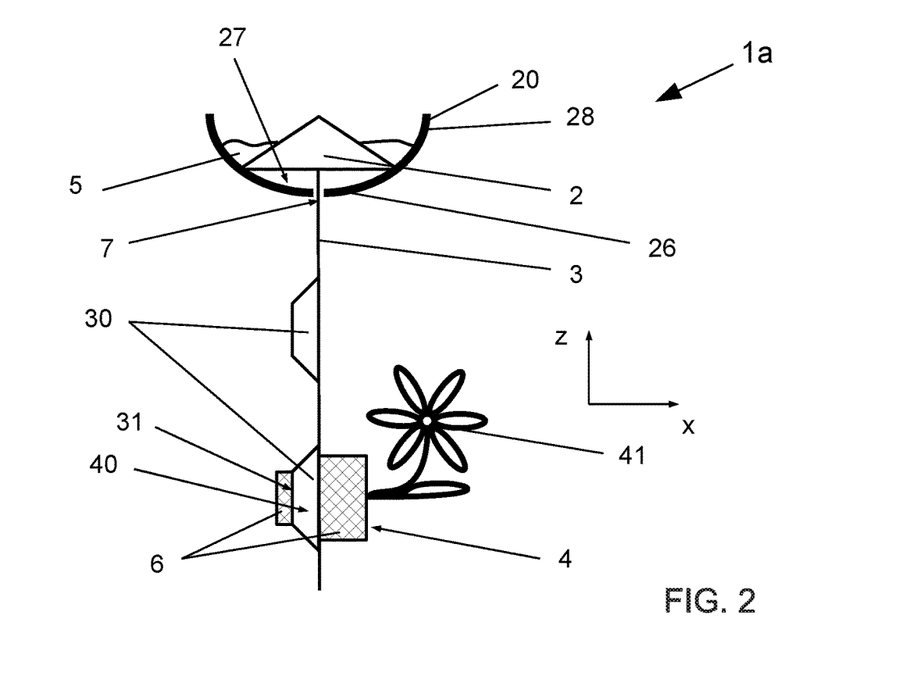
FIG. 2 schematically shows a possibility of fixing a seed and/or plant carrier in an embodiment of the seed and/or plant system according to the invention on a mounting in a side view.

FIG. 2 schematically shows a possibility of fixing a seed and/or plant carrier 3 of a seed and/or plant system 1a according to the invention, which can for example be a part of the seed and/or plant system 1 of FIG. 1, on a mounting 2 in a side view. Thereby, the same reference signs as in FIG. 1 correspond to the same or similar components, which is why it is being referred to the previous description of the components here.

In the embodiment of FIG. 2, the seed and/or plant carrier 3 is led through an opening 7 of a supply channel 20 and is fixed within the supply channel 20 by means of a mounting 2. The mounting 2 is formed as a triangular element in this embodiment, can, however, also comprise another form or arrangement. The mounting 2 is so heavy that it, due to its dead weight, lies on the inner wall in a base area of the supply channel 20, even when the supply channel 20 is filled with the liquid 5 and does not float upwards so that a fixation of the seed and/or plant carrier 3 in the supply channel 20 by means of the mounting 2 takes place. Furthermore, the mounting 2 comprises a larger transverse section than the opening 7 so that the mounting 2 cannot get through the opening 7. The mounting 2 comprises such a form that the liquid 5 is able to easily flow around the mounting 2 in the supply channel 20.

In other embodiments, the seed and/or plant carrier 3 can also be held in the opening 7 of the supply channel 20 by at least one knot inserted in the seed and/or plant carrier 3 or attached to it, wherein in that case the knot forms the mounting 2. Furthermore, the seed and/or plant carrier 3 can also be held in or on the supply channel 20 by one or several hook(s) provided on the supply channel 20, at least one eyelet and/or a differently formed mounting 2. It is also possible that the seed and/or plant carrier 3 is held laterally spaced apart from the supply channel 20 in an appropriate mounting 2. In that case is necessary that the seed and/or plant carrier 3 is in liquid guiding contact with the supply channel 20 for example via at least one tube or at least one hose or at least one channel or at least one other element guiding the liquid 5.

On a surface of the mounting 2 pointing towards a channel sink 27, the seed and/or plant carrier 3 is attached on the mounting 2. The seed and/or plant carrier 3 can for example be clamped in the mounting 2 or be held on the mounting 2 by means of a hook, an eyelet or suchlike. With suitable formation, the seed and/or plant carrier 3 can furthermore also be connected to the mounting 2 by welding, sticking, riveting or the like.

As illustrated in FIG. 2, a liquid 5 serving as a supply liquid for the seeds 42 and/or plants 41 of the seed and/or plant carrier 3, is provided in the supply channel 20. By protruding into the supply channel 20, the seed and/or plant carrier 3 is able to receive the liquid 5 and guide it through the entire seed and/or plant carrier 3 suspended from the supply channel 20 in order to supply the plants 41 or seeds 42 provided thereon with the liquid 5.

In the embodiment depicted in FIG. 2, the seed and/or plant carrier 3 is formed as an extruded tape, which comprises sleeves 40 which are formed through thermoformed areas 30 of the seed and/or plant carrier 3. The thermoforming used for this is comparable to a deep drawing process. In the embodiment shown in FIG. 2, the sleeve 40 is aligned transversely to the longitudinal extension z of the seed and/or plant carrier 3.

A substrate 6 carrying plants 41 and/or seeds 42 is inserted in the sleeves 40. The seeds 42 and/or plants 41 can thereby be provided in and/or on the substrate 6. The substrate 6 can also contain the seeds 42 and/or plants 41 already when inserting it in the sleeve 40, or the seeds 42 and/or plants 41 are only brought into the substrate 6 after inserting the substrate 6 in the sleeve 40.

As illustrated in FIG. 2, a base area 31 each of the thermoformed areas 30 is punched out so that openings form so that the substrate 6 can protrude on both sides of the sleeves 40. Thus, the substrate 6 can not only be suitably held, but can, as the embodiments of the present invention described below show, for one thing be ideally supplied with the liquid 5 on the root side of the plants 41, while on the other side of the substrate, the plant 41 can grow.

In the variant of the seed and/or plant system 1a shown in FIG. 2, the thermoformed area 30 is formed trapezoidal, but can also be formed cylindrical, cuboid or in a different form in other embodiments of the invention. Moreover, the dimensions of the thermoformed or deep-drawn areas 30 can also vary, whereby they can be ideally adjusted to the inserted plant species. The number of thermoformed or deep-drawn areas 30, which are provided on the seed and/or plant carrier 6 and form the sleeves 40, is also variable.

The embodiment of FIG. 2 comprises a rigid, linearly formed supply channel 20, which can also be formed as a supply tube in other variants of the seed and/or plant system 1 according to the invention. Furthermore, the supply channel 20 or the supply tube can also be formed wavelike or flexibly. Moreover, the dimensions, forms or materials of the supply channel 20 or the supply tube can vary.

Figure 3A:
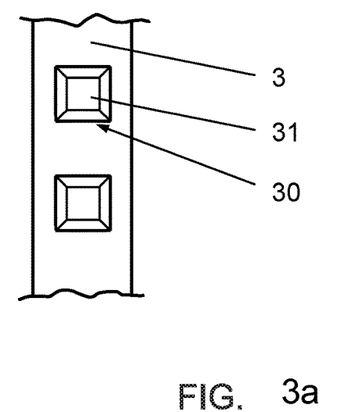
FIGS. 3a and 3b schematically show various embodiments of a thermoformed or deep-drawn area of seed and/or plant carriers of seed and/or plant systems according to the invention each in a side view.
Figure 3B:
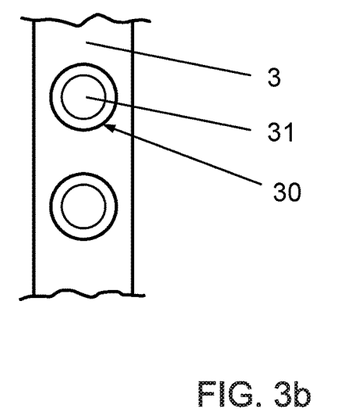

The FIGS. 3a and 3b schematically show different embodiments of thermoformed areas 30 of seed and/or plant carriers 2 made of plastic of seed and/or plant systems according to the invention each in a side view. As depicted in FIG. 3a, the thermoformed or deep-drawn area 30 of a seed and/or plant carrier 3 can for example comprise a pyramidal trunk-like formation. The base 31 of the thermoformed or deep-drawn area 30 is thereby preferably punched out or opened in another way, whereby a substrate 6 not depicted here can be ideally tucked into the thermoformed or deep-drawn area 30 and be held well therein.

As shown in FIG. 3b, the thermoformed or deep-drawn area 30 can, however, also comprise a conical form, whose base area 31 is also preferably punched out or opened in another way.

In other embodiments of the present invention, the thermoformed or deep-drawn area 30, which forms the sleeve 40, can of course also comprise other arrangements and dimensions. It is also possible to provide various embodiments of thermoformed or deep-drawn areas 30 on a seed and/or plant carrier 3.

Figure 4:
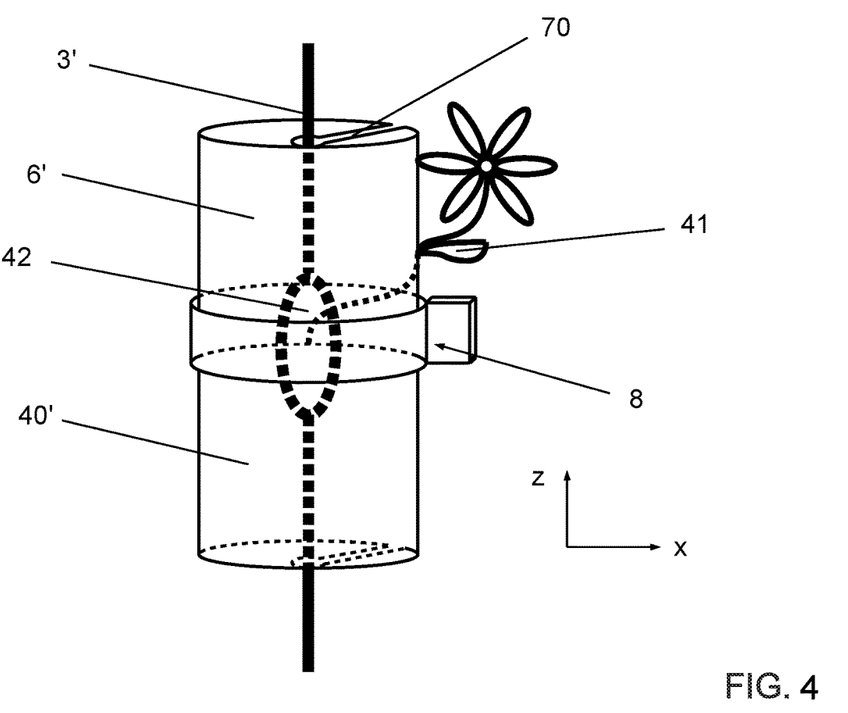
FIG. 4 schematically shows a variant of a sleeve attached around a seed and/or plant carrier of a seed and/or plant system according to the invention in a frontal view.

FIG. 4 schematically shows a variant of a sleeve 40' attached around a seed and/or plant carrier 3' of a seed and/or plant system according to the invention in a frontal view, whereby the same reference signs as in the previous figures refer to the same components and it is hereby being referred to their description.

In this embodiment, the seed and/or plant carrier 3' is preferably formed as a rope, string, cord, tether, chain or hose and comprises a substrate 6' formed as a sleeve 40' on spaced apart locations.

In the example shown in FIG. 4, the substrate 6' comprises an opening crack 70 for easily covering the seed and/or plant carrier 3' with the substrate 6'. For this, the substrate 6' is preferably formed flexibly in such a way that it can just be stretched for covering and tightens in such a way after the covering that it clamps on the seed and/or plant carrier 3'. In this embodiment, the substrate 6' is formed cylindrical, can, however, also comprise other forms in other variants.

In the substrate 6', one or several seeds 42 and/or at least one plant 41 are provided, which, due to the substrate 6', is ideally supplied with nutrients and is able to root well.

In the embodiment shown in FIG. 4, a bracket 8 is provided around the substrate 6' for holding the substrate 6'. In other embodiments of the present invention, instead of or additionally to the bracket 8, clamps, straps, strings or suchlike can also be used for fixing the substrate 6' on the seed and/or plant carrier 3'. The substrate 6' can also be fixed by means of a thickening of the seed and/or plant carrier 3' attached below the substrate 6', by means of a clamp provided below the substrate 6' or the like.

In the embodiment illustrated in FIG. 4, the substrate 6' is aligned longitudinally to the longitudinal extension z of the seed and/or plant carrier 3'. Thereby, the substrate 6' can be especially well fixed on the seed and/or plant carrier 3'. In other embodiments, the substrate 6' can, however, also be aligned transversely to the longitudinal extension z of the seed and/or plant carrier 3'.

Figure 5A:
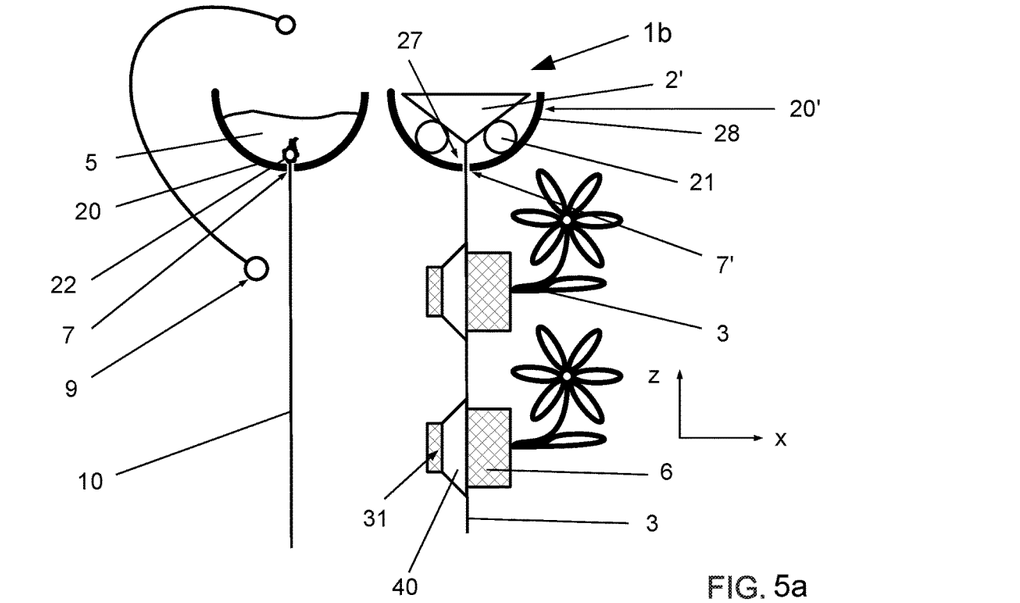
FIGS. 5a and 5b schematically show another embodiment of a seed and/or plant system according to the invention with sleeves formed from the seed and/or plant carrier each in a frontal view.
Figure 5B:
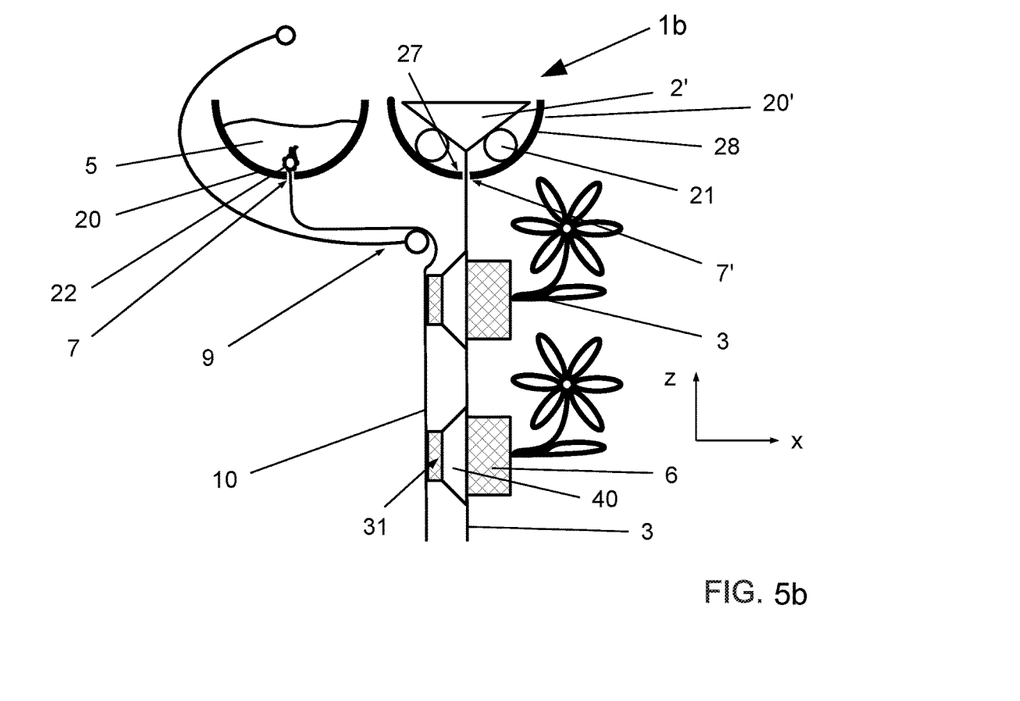

The FIGS. 5a and 5b schematically show another embodiment of a seed and/or plant system 1b according to the invention with sleeves 40 formed by a seed and/or plant carrier 3, wherein the same reference signs as in FIGS. 1 to 4 refer to the same components. It is hereby being referred to the above remarks concerning these components.

In the embodiment shown in the FIGS. 5a and 5b, at least one seed and/or plant carrier 3 is provided on a channel 20'. For fixing the at least one seed and/or plant carrier 3, it is led through an opening 7' of the channel 20' into the inside of the channel 20' and is held there by a mounting 2'.

The mounting 2' comprises a triangular form in this embodiment, wherein a corner of the mounting 2' pointing towards a channel sink 27 holds the seed and/or plant carrier 3 in the channel 20'. The corner of the mounting 2' pointing towards the channel sink 27 is guided by means of rollers 21 inserted in the channel 20', whereby the seed and/or plant carrier 3 is movable longitudinally of the channel extension in the channel 20'.

In further embodiments, the mounting 2 or 2' does not have to be guided, but can be firmly attached in or on the channel 20' or another suitable position of the seed and/or plant system 1b. The mounting 2' can also be guided in the channel 20' by means of a slide bearing or the like. The mounting 2' can also be formed differently; thus, it can for example also be formed as a hook, clamping device, eyelet or the like. However, the seed and/or plant carrier 3 is attached to the mounting 2' or received by it in such a way, that it is vertically suspended from the channel 20'.

The seed and/or plant carrier 3 shown in FIGS. 5a and 5b is fixed on the channel 20' in such a way that the opened base area 31 of the thermoformed or deep-drawn area 30, that is the sleeve of the seed and/or plant carrier 3, points towards a parallelly arranged supply strand 10. The supply strand 10 is fixed to a supply channel 20 provided next to the channel 20'.

In the embodiment of the FIGS. 5a and 5b, the supply strand 10 is led into the supply channel 20 through an opening 7 and is held there by a knot 22 inserted in the seed and/or plant carrier 3. Such a fixation is not only easy and cost-effective but also provides for an ideal liquid supply of the supply strand 10.

As illustrated in FIGS. 5a and 5b, the seed and/or plant system 1b comprises a swivel arm 9, which is placed in such a way that it can easily bring the supply strand 10 into contact with the substrate 6 protruding in the opened area 31 of the thermoformed or deep-drawn area 30.

As can be seen in FIG. 5b, the swivel arm 9 is advantageously provided in such a way on the seed and/or plant system 1b that a movement of the swivel arm 9 leads to the supply strand 10 being pushed towards the seed and/or plant carrier 3 until it contacts or touches the substrate 6. In order to be able to supply all substrates 6 provided on the seed and/or plant carrier 3 suitably via the supply strand 10 with the liquid 5, it is advisable to attach the swivel arm 9 as high up as possible on the seed and/or plant system 1b.

The contacting of the seed and/or plant carrier 3 with the supply strand 10 through the swivel arm 9, which can be established continuously or only temporarily, enables it to supply the seed and/or plant carrier 3 with the liquid 5 as needed. Hereby, not only the frequency of contact but also its duration of contact can be regulated, for example via a not depicted control and/or regulation unit of the seed and/or plant system 1b.

In other embodiments it is, however, also possible that the seed and/or plant carrier 3 is in constant contact with the supply strand 10 or the seed and/or plant carrier 3 is formed around the supply strand 10.

The liquid supply can be controlled by at least one valve provided on the supply strand 10 or the seed and/or plant carrier 3 or at least one nozzle provided thereon. It is also possible to provide at least one valve and/or at least one nozzle simultaneously to the swivel arm 9 for regulating the liquid discharge.

In the embodiment illustrated in the FIGS. 5a and 5b, the swivel arm 9 is arranged above the supply channel 20 and formed in curved fashion so that the swivel arm 9 can bring the supply strand 10 in contact with the seed and/or plant carrier 3 without being hindered by the supply channel 20. In other variants of the invention, the swivel arm 9 can also be arranged laterally or below the supply channel 20. Moreover, the swivel arm 9 can be formed linearly or angular. Furthermore, the material and/or the size of the swivel arm 9 can be chosen and adjusted depending on the individual circumstances.

Figure 6:
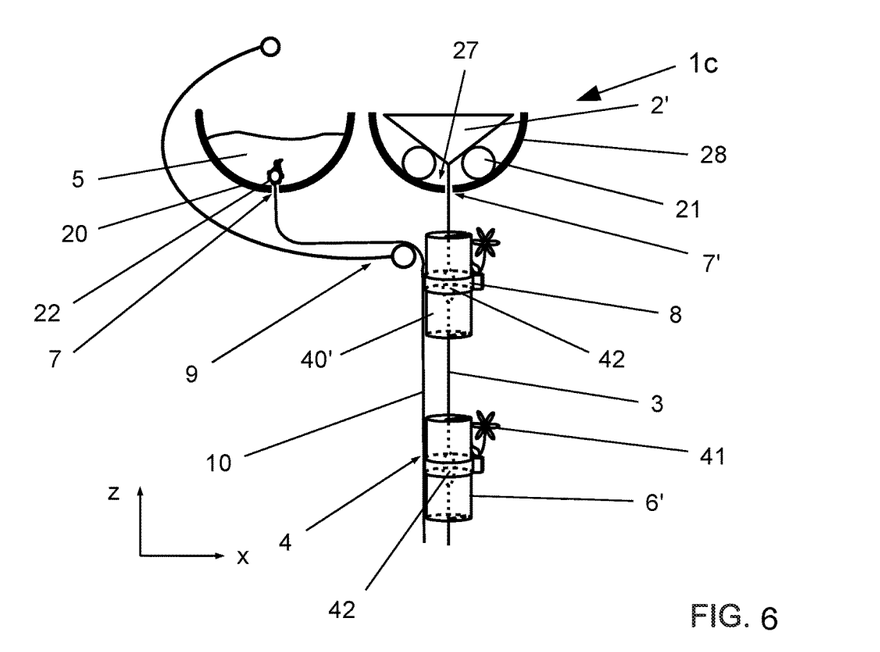
FIG. 6 schematically shows another variant of a seed and/or plant system according to the invention with sleeves attached around the seed and/or plant carrier in a frontal view.

FIG. 6 schematically shows another variant of a seed and/or plant system 1c according to the invention with sleeves 40' attached around a seed and/or plant carrier 3' in a frontal view. Thereby, the same reference signs as in the previous figures refer to the same components, which is why it is being referred to the previous description of these components here.

As shown in FIGS. 5a and 5b, the seed and/or plant system 1c depicted in FIG. 6 also comprises a channel 20' for holding a seed and/or plant carrier 3 and a supply channel 20 arranged parallel thereto for fixation and for liquid supply of the supply strand 10. Furthermore, the seed and/or plant system 1c also comprises a swivel arm 9 with which the supply strand 10 can be pressed against the seed and/or plant carrier 3.

In contrast to the embodiment shown in FIGS. 5a and 5b, the seed and/or plant carrier 3, however, comprises substrates 6' provided around the seed and/or plant carrier 3 which form the sleeves 40' here. In this embodiment, the supply strand 10 contacts the longitudinal sides of the substrates 6' respectively the sleeves 40'.

Figure 7:
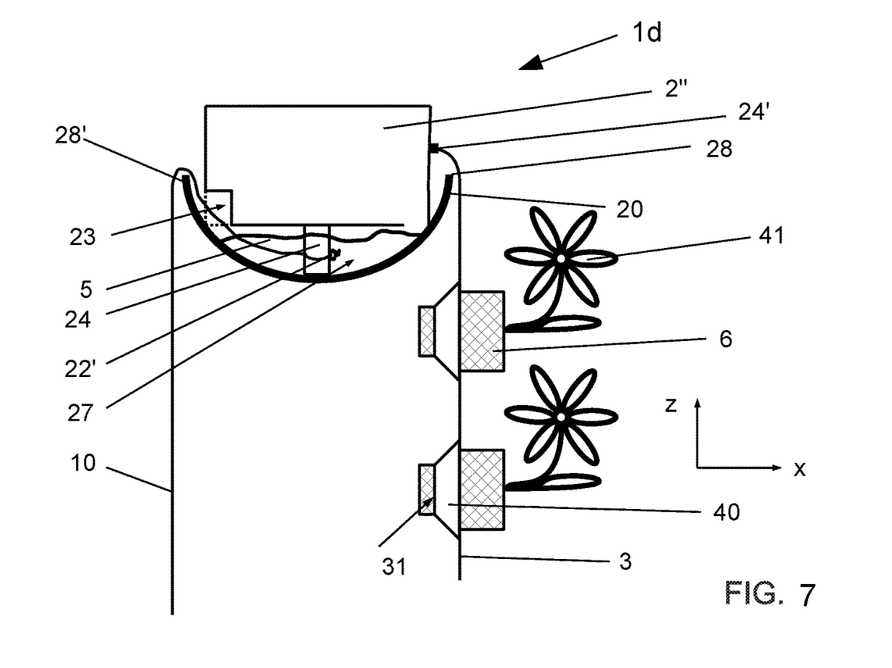
FIG. 7 schematically shows an embodiment of a seed and/or plant system according to the invention with a mounting for a seed and/or plant carrier and a supply strand in a supply channel in a frontal view.

FIG. 7 schematically shows another embodiment of a seed and/or plant system 1d according to the invention in which the seed and/or plant carrier 3 is held in a supply channel 20 with a mounting 2" in a frontal view. Already used reference signs here also refer to the same or similar components as in the figures described above.

In the embodiment shown in FIG. 7, both a supply strand 10 as well as the seed and/or plant carrier 3 are attached to the supply channel 20. For holding the supply strand 10 as well as the seed and/or plant carrier 3, the mounting 2''' is inserted in the supply channel 20, which is formed cuboid in the shown embodiment and is held in the supply channel 20 by means of its dead weight.

The mounting 2" is formed so large that it is held by the side walls of the supply channel 20 and does not touch the channel base. This has the advantage that the liquid 5 can easily flow below the mounting 2" in the supply channel 20 and the seed and/or plant carrier 3 can be ideally supplied with the liquid 5. Due to the cuboid form of the mounting 2" in the shown embodiment, it can lie stable in the supply channel 20". In alternative embodiments of the present invention, the mounting 2" can, however, also comprise other forms. The mounting 2" can also be formed from the most diverse materials.

Both the supply strand 10 as well as the seed and/or plant carrier 3 are held by the mounting 2" in the supply channel 20, wherein the supply strand 10 and the seed and/or plant carrier 3 each are led out of the supply channel 20 on channel walls 28, 28' opposing each other and freely suspended from them.

For holding the supply strand 10, the mounting 2" comprises a rod-like fixing element 25 protruding in the channel sink 27, around which the supply strand 10 is preferably bound. The supply strand 10 can furthermore also be clamped in the rod-like fixing element 24 for fixation or can be fixed on it by means of a hook or an opening. The fixation of the supply strand 10 on the rod-like fixing element 24 in the channel sink 27 allows for the supply strand 10 to be sufficiently supplied with the liquid 5 located in the supply channel 20.

In order for the supply strand 10 not to be clamped by the mounting 2" inserted in the supply channel 20 when being led out of the supply channel 20 and thus to interrupt the liquid supply, the mounting 2" comprises a lateral recess 23 arranged under which the supply strand 10 can be led outside. The recess 23 is hereby adjusted to the form and size of the supply strand 10.

Figure 8:
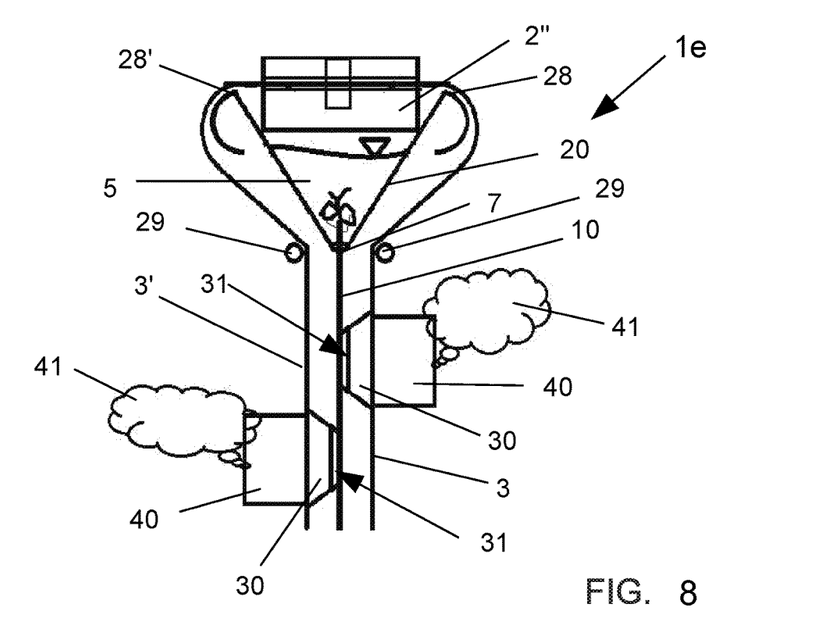
FIG. 8 schematically shows another variant of a seed and/or plant system according to the invention with a supply strand arranged in the middle, which supplies two seed and/or plant carriers with liquid, in a frontal view.

In the embodiments of the invention shown in FIGS. 7 and 8, the seed and/or plant carrier 3 is fixed on his first end to an upper end of the mounting 2" by means of a fixing element 24' and is led across the channel edge 28 so that a second end of the seed and/or plant carrier 3 is freely suspended.

The mounting 2" comprises such a height that an upper area, that is the area on which the seed and/or plant carrier 3 is fixed, projects the supply channel 20. This has the advantage that the seed and/or plant carrier 3 is not permanently in contact with the liquid 5. In the embodiments shown in FIGS. 7 and 8, the liquid supply of the seed and/or plant carrier 3 is achieved by a contacting of the supply strand 10 with the seed and/or plant carrier 3.

In the embodiment illustrated in FIG. 7, the seed and/or plant locations 4 are formed by thermoformed or deep-drawn areas 30 of the seed and/or plant carrier 3, that is, in form of the above described sleeves 40. In other embodiments of the invention, they can, however, be formed also or in addition to it by sleeves 40' enclosing the seed and/or plant carrier 3.

FIG. 8 schematically shows another possible embodiment of a seed and/or plant system 1e according to the invention. In FIG. 8 again the same reference signs as the previous figures also refer to the same or similar components, which is why it is being referred to the previous description concerning these components here.

The seed and/or plant system 1e comprises a supply channel 20 with a liquid 5 located therein. A mounting 2" is provided in the supply channel 20, on which two seed and/or plant carriers 3, 3' are fixed, which are vertically suspended on both sides of the supply channel 20. By guiding elements 29 provided lateral of a lower section of the supply channel 20, the two seed and/or plant carriers 3, 3' are guided towards each other in such a way that they run along parallel to each other close to an opening 7 of the supply channel 20, which serves for an outlet of liquid 5 from the supply channel 20, however, with regard to the alignment of the sleeves 40 provided on the seed and/or plant carriers 3, 3' run along symmetrically to each other. Thereby, the base areas 31 of the thermoformed or deep-drawn areas 30 of the sleeves 40, each comprising an opening, are to be provided opposite each other, that is showing in one direction of the middle of the seed and/or plant system 1e.

A supply strand 10 is suspended on the opening 7, which is supplied with the liquid 5 via the opening 7. The seed and/or plant carriers 3, 3' are arranged so close to each other that the openings of the thermoformed or deep-drawn areas 30 of the sleeves 40 contact the supply strand 10 and thereby substrates 6 provided in the sleeves 40 receive liquid 5 guided through the supply strand 10 and therewith are able to supply the plants 41 in the sleeves 40.

Figure 9:
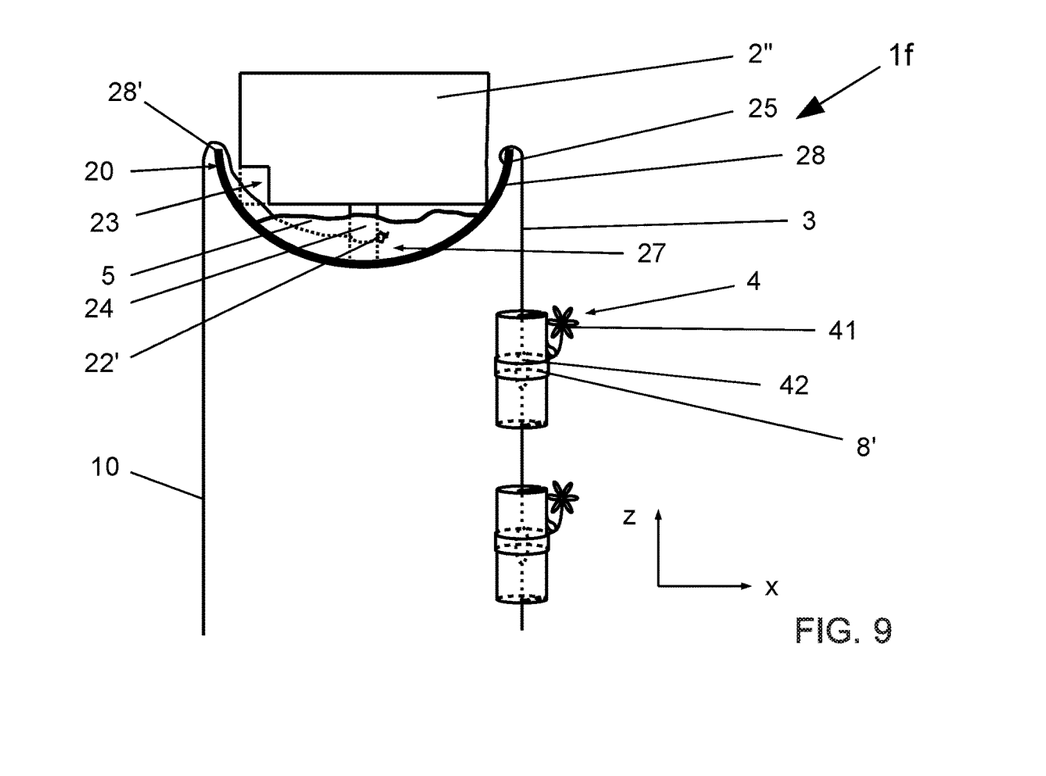
FIG. 9 schematically shows another embodiment of a seed and/or plant system according to the invention with a mounting provided in a supply channel for a seed and/or plant carrier and a supply strand in a frontal view.

FIG. 9 schematically shows another embodiment of a seed and/or plant system 1f according to the invention with a mounting 2" provided in a supply channel 20 in a frontal view, wherein the same reference signs as in the previous figures refer to the same components. It is hereby being referred to the above descriptions concerning these components.

In the embodiment of FIG. 9, the seed and/or plant locations 4 are formed by sleeves 40' enclosing the seed and/or plant carrier 3, however, can also be formed by deepenings in the seed and/or plant carrier 3.

In the embodiment of FIG. 9, the seed and/or plant carrier 3 is not fixed on the mounting 2", but on the supply channel 20. For this purpose, the supply channel 20 can either comprise an opening for fixing the seed and/or plant carrier 3 by means of a thickening provided thereon, such as a knot, or else a hook, an eyelet, a clamping device or the like. As shown, a fixing element 25 can for example be arranged on an upper area of the supply channel 20 for fixing the seed and/or plant carrier 3, whereby an unwanted leakage of the liquid 5 from the supply channel 20 can, among other things, be prevented.

Furthermore, a supply strand 10 is provided on the supply channel 20 in the example of FIG. 9. In the shown embodiment, the supply strand 10 is attached to a fixation 25 located below the water level of the liquid 5 in the supply sink 27, in order to be able to supply it sufficiently with the liquid 5. Both the supply strand 10 as well as the seed and/or plant carrier 3 can also be fixed on any other position of the supply channel 20.

Figure 10:
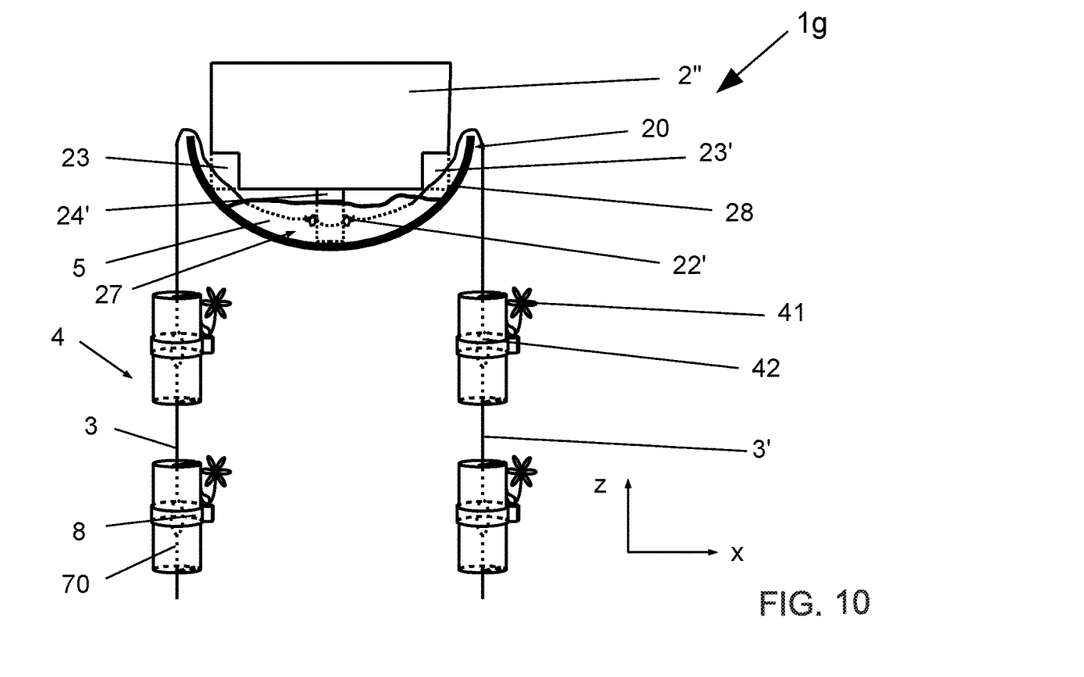
FIG. 10 schematically shows an alternative possibility of forming a seed and/or supply system according to the invention with a mounting provided in a supply channel for seed and/or plant carriers vertically suspended on both sides of the supply channel in a frontal view.

FIG. 10 schematically shows an alternative possibility of an embodiment of a seed and/or plant system 1g according to the invention with a mounting 2" for two seed and/or plant carriers 3, 3' provided in a supply channel 20 in a frontal view, wherein the same reference signs here also refer to the same components as in the previous figures and to the above explanations concerning these components it is being referred to.

In the embodiment illustrated in FIG. 10, no separate supply strand 10 is provided, both seed and/or plant carriers 3, 3' are rather directly supplied with the liquid 5. For this, the seed and/or plant carriers 3, 3' can, as shown in the embodiment depicted in FIG. 10, either be fixed on the mounting 2, 2" or else may be directly attached to the supply channel 20. Apart from the shown arrangement of the seed and/or plant carriers 3, 3', the number of the seed and/or plant carriers 3, 3' as well as their formation can also be varied in any way.

When arranging and forming the seed and/or plant system 1g, it only matters that the seed and/or plant locations 4 and thus the seeds 42 and/or plants 41 are sufficiently supplied with the liquid 5.

Figure 11:
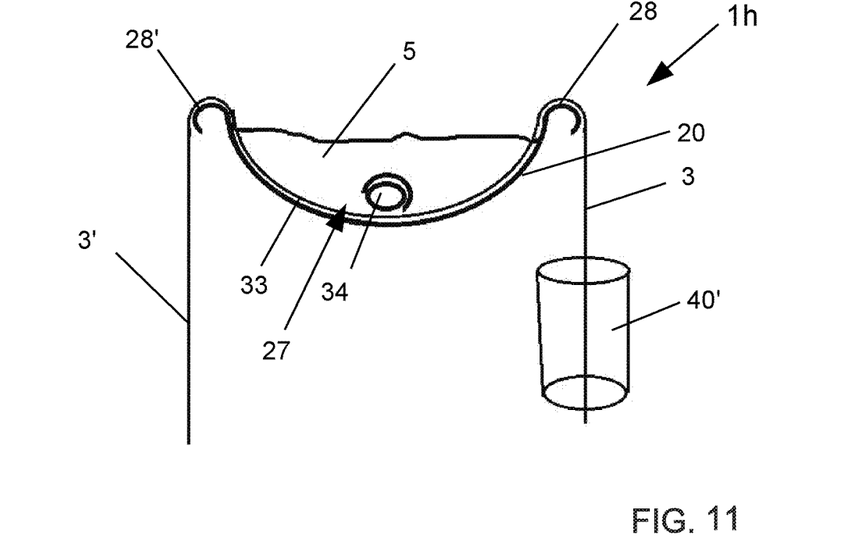
FIG. 11 schematically shows another part of another embodiment of a seed and/or supply system with two seed and/or plant carriers supplied with liquid via a supply channel, which are connected to each other by a strand continuously running through the supply channel in a frontal view.

FIG. 11 schematically shows a part of another embodiment of a seed and/or plant system 1h according to the invention with two seed and/or plant carriers 3, 3' supplied with liquid 5 via a supply channel 20, which are connected to each other by a strand 33 running continuously through the supply channel 20 in a frontal view.

The strand 33 is held in the channel sink 27 of the supply channel 20 by means of an element 34 such as a pressed down stick, located in the supply channel 20 not floating in the liquid 5 so that the strand 33 and above it the seed and/or plant carriers 3, 3' can be supplied with the liquid 5 located in the supply channel 20.

The invention claimed is:

1. A seed and/or plant system, comprising:
a mounting;
at least one supply tube or at least one supply channel;
at least one carrier being strand-shaped and provided for carrying at least one seed and/or at least one plant and secured on said mounting in a suspended manner, said carrier having several locations for holding the plant or the seed and disposed at a distance from each other in a longitudinal extension, wherein the seed and/or the at least one plant is supplied with a liquid via said at least one supply tube or said at least one supply channel;
sleeves, at least one of said sleeves disposed at each of said locations, respectively;
a substrate with the seed and/or the plant being received at said at least one sleeve and/or said sleeve at least partially forms said substrate for the seed and/or the plant;
said sleeve is formed from said carrier and is transversely aligned to the longitudinal extension of said carrier, said carrier having a thermoformed or deep-drawn area forming said sleeve, wherein said thermoformed or deep-drawn area having a base area with at least one opening formed therein, or said sleeve is formed around said carrier and said sleeve clamps on said carrier and/or is fixed on said carrier by means of at least one fixing element; and
said carrier formed from extruded plastic and/or at least one metal track and/or at least one textile strap or at least from a composite of at least two of these materials.

2. The seed and/or plant carrier according to claim 1, wherein said fixing element is a bracket or a C-ring.

3. The seed and/or plant carrier according to claim 1, wherein said fixing element contains the seed.

4. The seed and/or plant system according to claim 1, wherein said substrate contains at least one material selected from the group consisting of rock wool, minerals, artificial textile fiber, natural textile fiber, at least one open-pored organic foam structure and at least one open-pored inorganic foam structure.

5. The seed and/or plant system according to claim 1, further comprising a supply strand guiding the liquid and is fixed parallel to said carrier on said supply tube or said supply channel, wherein said supply strand is in water-guiding contact with said carrier.

6. The seed and/or plant system according to claim 5, further comprising a pressing element selected from the group consisting of an arm, a swivel arm, at least one guidance, a lever, and a rocker for pressing said at least one supply strand against said carrier or vice versa.

7. The seed and/or plant system according to claim 5, wherein said supply strand guiding the liquid is at least partially led through said carrier.

8. The seed and/or plant system according to claim 5, wherein said supply tube or said supply channel has a base with an opening formed therein, said supply strand leads through said opening in said base of said supply tube or said supply channel and is vertically suspended from said base.

9. The seed and/or plant system according to claim 5, wherein said supply channel has a channel sink and a channel edge, said supply strand is fixed in said channel sink and leads across said channel edge of said supply channel.

10. The seed and/or plant system according to claim 5, wherein said supply strand is fixed on a same said supply channel as said carrier.

11. The seed and/or plant system according to claim 5, wherein:
said supply strand protrudes into said supply channel and is fixed on or in said the supply channel; and
said carrier is one of at least two carriers fixed on said supply channel and are led to said supply strand in such a way that said locations of said carriers are in water-guiding contact with said supply strand.

12. The seed and/or plant system according to claim 1, wherein said supply tube or said supply channel has a liquid discharge opening formed therein;
further comprising at least one valve disposed on said liquid discharge opening of said supply tube or said supply channel; and
further comprising a supply strand guiding the liquid or on another location of components guiding the liquid of the seed and/or plant system with which the liquid supply to said supply strand and/or from said supply strand to said carrier can be controlled or regulated.

13. The seed and/or plant system according to claim 1, further comprising a slide bearing, said carrier is stored on or in said mounting by means of said slide bearing.

14. The seed and/or plant system according to claim 13, wherein said carrier is one of a plurality carriers stored on or in said mounting by means of said slide bearing, at least a number of said carriers is coupled to each other by means of a permanent or detachable connection for a joint movability of said carriers.

15. The seed and/or plant system according to claim 1, wherein said supply tube or said supply channel forms said mounting for said carrier.

16. The seed and/or plant system according to claim 1, wherein:
said supply channel has a channel sink; and
said carrier is one of at least two carriers disposed on said supply channel and are fixed in said channel sink of said supply channel.

* * * * *